(12) United States Patent
Tomsen

(10) Patent No.: US 7,313,802 B1
(45) Date of Patent: Dec. 25, 2007

(54) METHOD AND SYSTEM TO PROVIDE DEALS AND PROMOTIONS VIA AN INTERACTIVE VIDEO CASTING SYSTEM

(75) Inventor: Mai-lan Tomsen, Seattle, WA (US)

(73) Assignee: Digeo, Inc., Kirkland, WA (US)

( * ) Notice: Subject to any disclaimer, the term of this patent is extended or adjusted under 35 U.S.C. 154(b) by 999 days.

(21) Appl. No.: 09/736,952

(22) Filed: Dec. 13, 2000

Related U.S. Application Data (60) Provisional application No. 60/220,798, filed on Jul. 25, 2000, provisional application No. 60/236,422, filed on Sep. 28, 2000.

(51) Int. Cl.
H04N 7/16 (2006.01)
H04N 5/445 (2006.01)

(52) U.S. Cl. .................. 725/23; 725/22; 725/24; 725/32; 725/46

(58) Field of Classification Search .............. 725/9, 725/13, 24, 46, 22, 23, 32; 705/10, 14, 26
See application file for complete search history.

(56) References Cited

U.S. PATENT DOCUMENTS

| | | | | |
|---|---|---|---|---|
| 5,227,874 A * | 7/1993 | Von Kohorn | ................. | 705/10 |
| 5,819,034 A | 10/1998 | Joseph et al. | .......... | 395/200.31 |
| 5,929,849 A | 7/1999 | Kikinis | ....................... | 345/327 |
| 5,960,411 A | 9/1999 | Hartman et al. | ............... | 705/26 |
| 5,983,200 A | 11/1999 | Slotznick | | |
| 6,029,195 A * | 2/2000 | Herz | .......................... | 725/116 |
| 6,418,441 B1 * | 7/2002 | Call | ............................ | 707/10 |
| 6,463,585 B1 * | 10/2002 | Hendricks et al. | ............ | 725/35 |
| 6,532,589 B1 | 3/2003 | Proehl et al. | | |
| 6,792,615 B1 * | 9/2004 | Rowe et al. | .................. | 725/37 |
| 6,850,901 B1 * | 2/2005 | Hunter et al. | ................. | 705/26 |
| 2001/0014868 A1 * | 8/2001 | Herz et al. | ..................... | 705/14 |

OTHER PUBLICATIONS

Tomsen, "Killer Content: Strategies for Web Content and E-Commerce", Addison-Wesley, 2000.

* cited by examiner

Primary Examiner—Kieu-Oanh Bui
(74) Attorney, Agent, or Firm—Darby & Darby P.C.; M. David Ream (57) ABSTRACT

A viewer of an interactive video casting system can be presented with promotions having purchase offers or offers of credits toward future purchases. These promotions can be provided by correlating a program being viewed with user profile information and product information. If presented with the promotion while viewing a program, the viewer can buy products/services offered in the promotion, or defer the promotion for future viewing or as a credit. Credits toward a future purchase can be maintained in a storage area for the user and applied to a later purchase. Promotions can also be correlated to other interactive video casting tools or interfaces, such as the user's calendar, so that promotions relevant to calendar entries can be presented to the user.

11 Claims, 11 Drawing Sheets

METHOD AND SYSTEM TO PROVIDE DEALS AND PROMOTIONS VIA AN INTERACTIVE VIDEO CASTING SYSTEM

CROSS-REFERENCE TO RELATED APPLICATIONS

The present application claims the benefit of U.S. Provisional Patent Application Ser. No. 60/220,798, filed Jul. 25, 2000, entitled "METHODS AND SYSTEMS FOR COMMERCE VIA INTERACTIVE TELEVISION" and U.S. Provisional Patent Application Ser. No. 60/236,422, filed Sep. 28, 2000, entitled "METHODS AND SYSTEMS FOR COMMERCE VIA INTERACTIVE TELEVISION," both of which are incorporated herein by reference.

BACKGROUND OF THE INVENTION

1. Field of the Invention

The present invention relates generally to commerce over a data communication network, and more particularly, to transactions involving goods and/or services conducted via an interactive video casting network having connectivity to the data communication network.

2. Background Information

An important business element in the production and distribution of television programming is revenue received from manufacturers and service providers who pay to advertise and sell their products. The survival of a television program is heavily dependent on the advertising revenue that can be realized from the television program. Advertisers in turn rely on the ability of the television program to draw viewers who then become potential purchasers of the advertised products. Advertisers attempt to match television commercials with the audience demographic of a particular television show.

Targeting potential customers through television advertising has its limitations. For example, the viewer may lack the motivation to travel to a store or to make a telephone call to purchase the advertised product. In some cases, the viewer must independently access the World Wide Web via the Internet to purchase an advertised product from a merchant's web site. Providing purchasing opportunities through a web site has proven to be less than successful for merchants in some instances, since the user has to navigate through web pages, the user's transaction history is sometimes difficult or cumbersome to track, advertisements targeted to the user are not always readily available, etc.

Also, a variety of people from different purchasing demographics may be watching the same television program. Advertising aimed at one particular group may be uninteresting or even displeasing to another group. Furthermore, television advertising can be untimely. Advertisers and/or merchants typically work weeks or months ahead of time to produce commercials for a particular holiday or sales promotion. Merchants have difficulty making quick adjustments in advertising plans due to changes in inventory or customer desires.

Accordingly, improvements are needed in the presentation of advertisements or promotions to potential customers.

SUMMARY OF THE INVENTION

The above described problems relating to the Internet and television may be overcome the present invention. The present invention comprises a method and system to provide deals and promotions via an interactive video casting system. In accordance with an embodiment of the invention, a viewer of the interactive video casting system can be presented with promotions having purchase offers or offers of credits toward future purchases. These promotions can be provided by correlating a program being viewed with user profile information and product information. If presented with the promotion while viewing a program, the viewer can buy products/services offered in the promotion, or defer the promotion for future viewing or as a credit. Credits toward a future purchase can be maintained in a storage area for the user and applied to a later purchase. Promotions can also be correlated to other interactive television tools or interfaces, such as the user's calendar, so that promotions relevant to calendar entries can be presented to the user. According to an aspect of the invention, a command sent from a user input device in response to the displayed information is processed to initiate a transaction related to the promotion. In accordance with an additional embodiment of the present invention, the method and system to provide deals and promotions are integrated by software across multiple portals of the interactive video casting system. The multiple portals may include, for example, all or some of the following: an interactive television portal; a computer portal; a personal digital assistant portal; and a cellular phone portal. Such integration across multiple portals increases and magnifies the power of the deals and promotions to encourage more frequent transactions.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a method and system to provide promotions or deals via interactive video casting are described herein. In the following description, numerous specific details are provided, such as the description of system components in FIGS. 1-3, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides products and services, or credits towards products and services, via interactive video casting based on user and merchant data. For example, while a viewer or user is watching a professional football game, the viewer is presented with an opportunity (e.g., an advertisement, promotion, offer, deal, etc.) to purchase a product related to the sport of football. The product being offered is selected by correlating the football game broadcast segment with the viewer's profile and merchant product data. In one embodiment, the transaction can be initiated and completed via a user input device.

Figure 1:
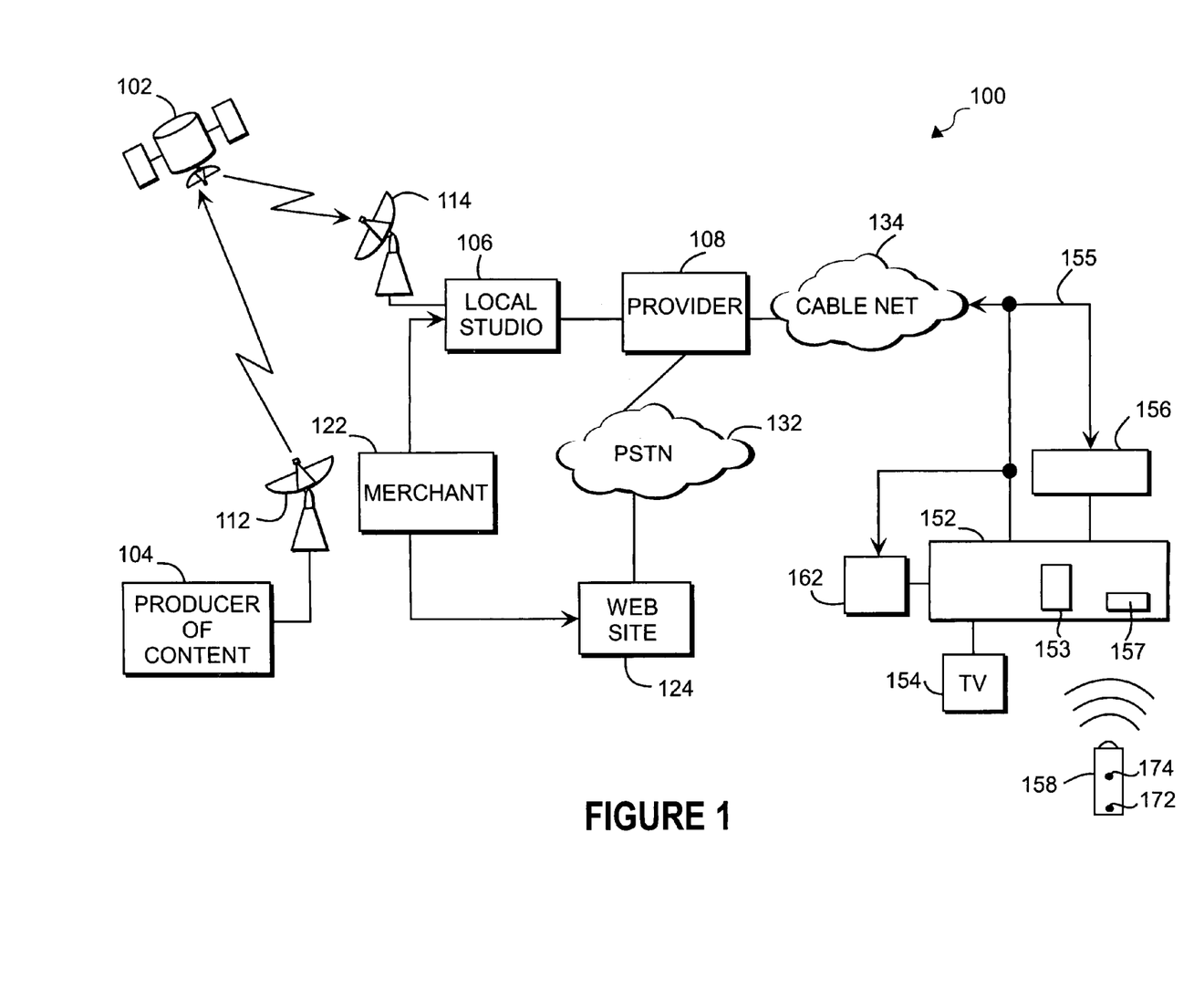
FIG. 1 shows an example of an interactive video casting system that can implement an embodiment of the invention.

FIG. 1 shows an example arrangement of an interactive video casting system 100 in accordance with an embodiment of the invention. A production company 104 produces programming content for transmission to viewers. The transmission is sent via satellite transmission transceiver 112 over an uplink channel to a satellite 102. The satellite 102 then transmits the programming content over a downlink channel to a local studio 106. The local studio 106 can insert additional programming (e.g., regional programming) and/or advertisements as needed into the programming content. The content with the insertions is then transmitted from the local studio 106 via a satellite transmission transceiver 114 to a cable service provider 108. In an embodiment, the television program may be downloaded to a receiving station, such as a head-end (H/E) of the cable service provider 108, rather than or in addition to the local studio 106. A reverse channel from the cable service provider 108 to the local studio 106 is provided so that the local studio 106 can insert additional programming content and feed the television signal back to the cable service provider 108. The cable service provider 108 then delivers the television signal over a cable network 134 to cable subscribers.

The cable network 134 is provided by the cable service provider 108 to distribute the programming content to cable subscribers. A set top box (STB) 152, located on the premises of a cable television subscriber, receives the programming content or television signal, and delivers the television signal to the subscriber's television set 154. Alternatively or in addition, the television signal can be broadcast over a wireless medium and received by a traditional aerial antenna or by a satellite dish, and then delivered to the set top box 152. Alternatively or additionally, features and functionality of the set top box 152 may be integrated into a type of advanced television or other display device.

Moreover, embodiments of the invention can use other types of broadcast media, including but not limited to, digital cable systems, satellite, very-high-data-rate digital subscriber line (VDSL), web casts, etc. The features provided by the television set 154 can also be provisioned, in one embodiment, by a personal computer (PC) suitably configured with an adapter to convert television signals into a digitized format, and then to deliver the television signals to the video portion of the computer for display. It is noted that the invention is not limited to any one configuration of display hardware, as embodiments of the invention will work equally well using alternative reception and display arrangements.

In accordance with an embodiment of the invention, a connection to a communication network is provided for the cable subscriber. In one embodiment, the connection can be made via a cable modem 156 over a bi-directional communication link 155 to a cable modem termination system within the cable provider's 108 equipment. The connection continues to a data communication network, such as the Internet, by way of a public switched network (PSTN) 132. The PSTN network 132 is provided herein as an example, and it is understood that other types of networks may be used for connectivity to the Internet. A cable modem arrangement can be used because of its high bandwidth capability. In situations where some cable companies are not equipped to provide cable modem service to their customers, various other arrangements can be made. For example, a conventional modem connection can be used to access the Internet over a telephone line. As another example, Internet access can be gained over a DSL connection or an integrated services digital network (ISDN) connection using a telephone line. Wireless systems are also available for providing Internet access. In one embodiment, downstream data transmission can occur via cable or satellite, and upstream data transmission can occur via a telephone line.

It is noted that the Internet is chosen as an example of a data communication network because it is a well-established network, and connectivity to the Internet is easily made. However, it is noted that a global communication network, such as the Internet, is not required to practice other embodiments of the invention. A locally provided and maintained communication network may be used in an embodiment.

Continuing with FIG. 1, the set top box 152 can include a transceiver 157, such as an infrared (IR) or radio frequency (RF) transceiver, that can exchange signals with a remote control unit 158 or other user input device. The set top box 152 can be a component that is separate from the television set 154 as shown in FIG. 1, or its features can be built into circuitry of the television set 154 (e.g., an interactive television set). The set top box 152 enables a viewer to select a television program to view and then delivers the television program to the television set 154. A storage unit 162 can also be coupled to or be a part of the set top box 152. The storage unit 162 can comprise a machine-readable storage medium such as a cache, buffer, memory, diskette, compact disk, tape, or the like and their associated hardware, in one embodiment. In another embodiment the storage unit 162 can include a video cassette recorder (VCR). In another embodiment, the storage unit can include a hard disk such as a digital or personal video recorder (DVR or PVR).

As noted above, the local studio 106 can insert additional programming into the received transmission, for example, to provide cable content that includes locally provided channels. The programming is then distributed to customers over the cable network 134. In addition to local program insertion, the local studio 106 can insert advertising content. Product supplemental information relating to the advertising for participating merchants 122 can also be inserted. Product supplemental information can include information relating to the goods or services being advertised in the commercial. In addition to goods and services, coupons and other information services can be made available to the viewer, which in one embodiment can be obtained via the merchant's 122 web site 124 on the Internet. Triggers, such as Advanced Television Enhancement Forum (ATVEF) triggers, which are related to the web site 124 and/or to its contents, can be continuously updated as the television broadcast is being received.

In accordance with an embodiment of the invention, a participating merchant list 153 may be maintained. As the name implies, this list permits participating merchants 122 to provide their product supplemental information to the viewer. The participating merchant list 153 may be provided to and stored in the set top box 152. Alternately or additionally, the participating merchant list 153 may be stored at a head-end or other system of the cable service provider 108, or at a third party system. In this embodiment, the participating merchant list 153 may operate as a "white" list which allows transmission of triggers from authorized merchants and filters out other triggers. In another embodiment, a "blocked" or "black" list may be maintained at the set top box 152 or elsewhere. Such a blocked list filters out undesirable triggers and may be created and/or maintained by the cable service provider 108. Alternately or additionally, such a blocked list may be edited by an end user.

Various techniques for carrying the product supplemental information can be used. For example, triggering, announcement, or resource information can be included and sent using the ATVEF standard, in a manner known by those skilled in the art. For instance, a uniform resource locator (URL) address can be embedded in the broadcast stream. Other standards that may be used include triggering mechanisms from Wink and WorldGate. Another technique is to embed code or a script in the stream that runs on the client (e.g., at the set top box 152) to provide the information and/or purchase experience.

Figure 2:
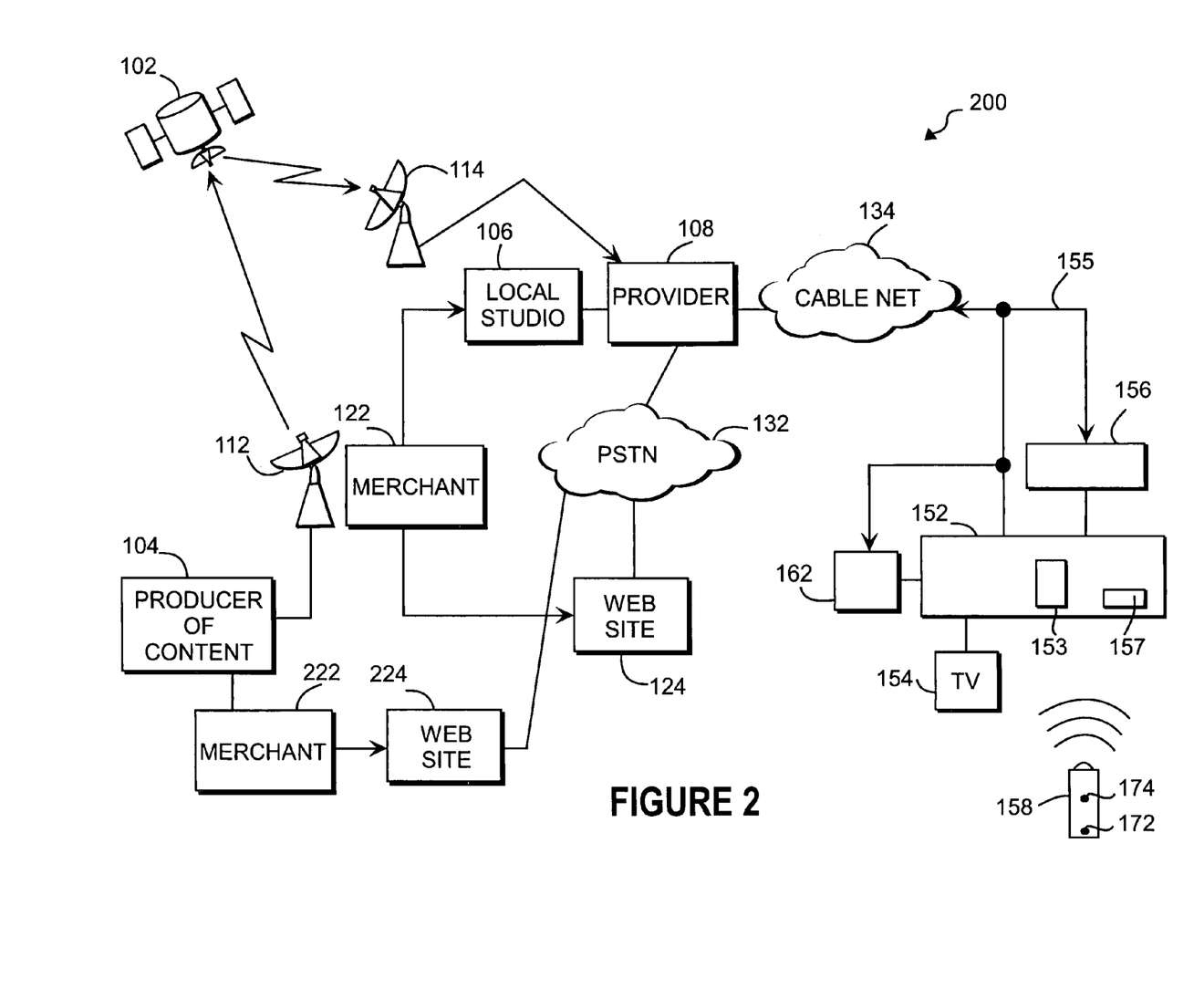
FIG. 2 shows an example of an interactive television system that can implement an embodiment of the invention.

As noted above, the triggers, resources, or announcements can be inserted by the originating broadcaster 104, a local broadcaster 106, or by the cable system operator 108. FIG. 2 shows another example of an interactive video casting system 200 and illustrates another point of insertion of the product supplemental information. Here, a merchant 222, operating a web site 224, is located such that commercial insertion is made prior to the uplink transmission to the satellite 102.

As noted above, Internet access is not necessary to practice the invention. A locally provided network may be within the scope of the invention as claimed. The cable provider 108 can supply the foregoing features, for example, by providing a web site or "walled garden" that is accessed by its subscribers. In such a case, the cable provider 108 serves as an intermediary and submits the purchases to the actual merchants 122 or 222.

Figure 3:
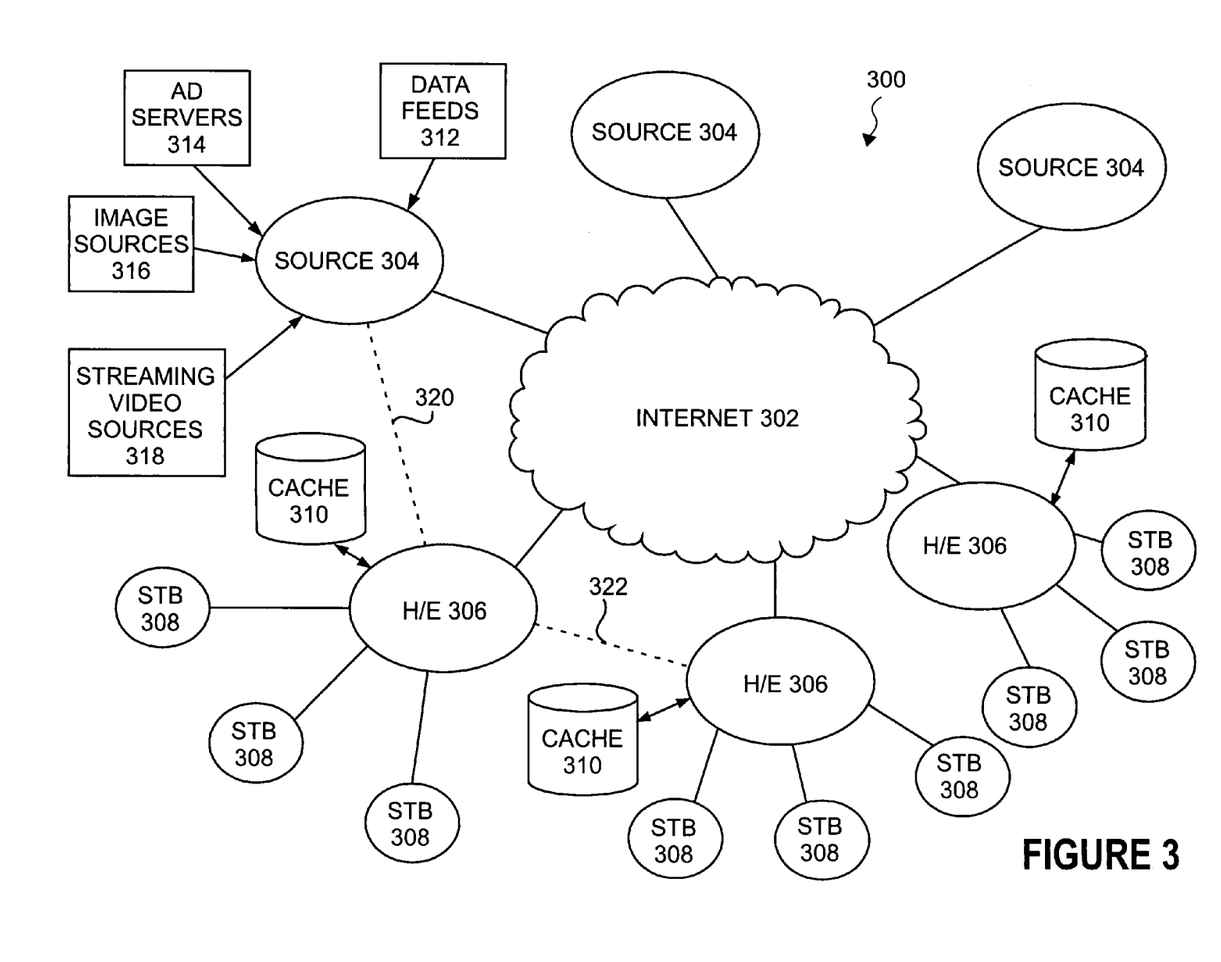
FIG. 3 shows an example of an interactive video casting system that can implement an embodiment of the invention.

FIG. 3 shows another example of an interactive video casting system 300 for distributing Internet content in addition to television content. The system 300 can be similar to or combined with the systems 100 and 200 shown in FIGS. 1 and 2, respectively. In accordance with an embodiment of the present invention, the system 300 can be integrated with a cable television distribution system. The system 300 includes an Internet 302, a plurality of content sources 304, a plurality of distribution centers (depicted as the head-ends or H/Es 306), and a plurality of client terminals 308 (depicted as set top boxes). In addition, a content source 304 is depicted as receiving data from data feeds 312, advertisement servers 314, image sources 316, and streaming video sources 318.

The plurality of content sources 304 is coupled to the Internet 302. For example, a content source 304 may comprise a web site portal such as Go2Net.com, or a news web site such as CNN.com, or other types of sources. Each content source 304 may have various data feeds 312, servers 314, and sources 316/318 coupled to it.

For example, news or stock quote feeds 312 may be fed into the content source 304. Servers 314 may provide advertisements for insertion into multimedia content delivered by the content source 304. Sources 316/318 may provide images 316, streaming video 318, and other content to the content source 304. Various other feeds, servers and sources may also be coupled to the content source 304 of FIG. 3, or coupled to the production company 104, cable network 134, web sites 124 and 224, or to other components of the systems shown in FIGS. 1 and 2.

The Internet 302 comprises a network of networks and is well known in the art. Communications over the Internet 302 can be accomplished using standard protocols such as transmission control protocol/internet protocol (TCP/IP), hypertext transfer protocol (HTTP), file transfer protocol (FTP), or other protocols. The Internet 302 is coupled to the plurality of distribution centers 306, and each distribution center 306 is in turn coupled to a plurality of client terminals 308, which may comprise a set top box, a PC, an interactive television set, or another type of communication device or display device.

In alternative or in addition to the Internet 302 being used to distribute multimedia content from the content sources 304 to distribution centers 306, communications channels or networks 320 apart from the Internet 302 may couple one or more content sources 304 to one or more distribution centers 306. One example of such an alternate path for communications is illustrated by a first dashed line 320 in FIG. 3. Alternately or additionally, peering connections may exist between distribution centers 306. One example of such peering is illustrated by a second dashed line 322 in FIG. 3. Other configurations are also possible and are included within the scope of the present invention.

Caches 310 may be provided at (or coupled to) the distribution centers 306. Such caches 310 may be used to increase the performance in the delivery of multimedia content to the client terminals 308. For example, larger files for video and other high bandwidth content may be stored in such caches 310, which may be closer to the client terminals 308 than to the content sources 304. In addition, reliability and guaranteed bandwidth may be provided because the Internet 302 is not in-between such caches 310 and the client terminals 308.

In accordance with one embodiment of the invention, different or multiple portals may be used to access the information provided through the interactive video casting systems of FIGS. 1-3, based on the type of client terminal being used by the end user. That is, for example, a television portal may be provided for an end user that uses the television set 154 to access the information. A PC portal may be provided for an end user that uses a PC to access the information. Portals can be provided for end users that use cellular telephones, PDAs, audio devices, etc. to access the interactive video casting systems of FIGS. 1-3.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the client terminal.

In another embodiment, the cable provider 108 can deliver signals having different formats to the various client terminals, with the client terminals not necessarily having special adapters. Therefore, as an example, the cable provider 108 or other party can generate/deliver information (e.g., television programming, web page content, etc.) having a format that is compatible for end users that receive the information via the television set 154. The cable provider 108 or other party can also generate/deliver the same information (e.g., simultaneously with the television portal on the same communication link, separately on a different communication link, on-demand independent of the television portal, etc.) using a format that is compatible with end users that receive the information via PCs, PDAs, cellular telephones, etc. Thus, the term "interactive video casting system" is used to describe generally a system that can deliver video information over any network and any network-compatible device by broadcasting, multicasting, or unicasting. An "interactive television system" is one type of or one means of access to an "interactive video casting system."

Figure 4:
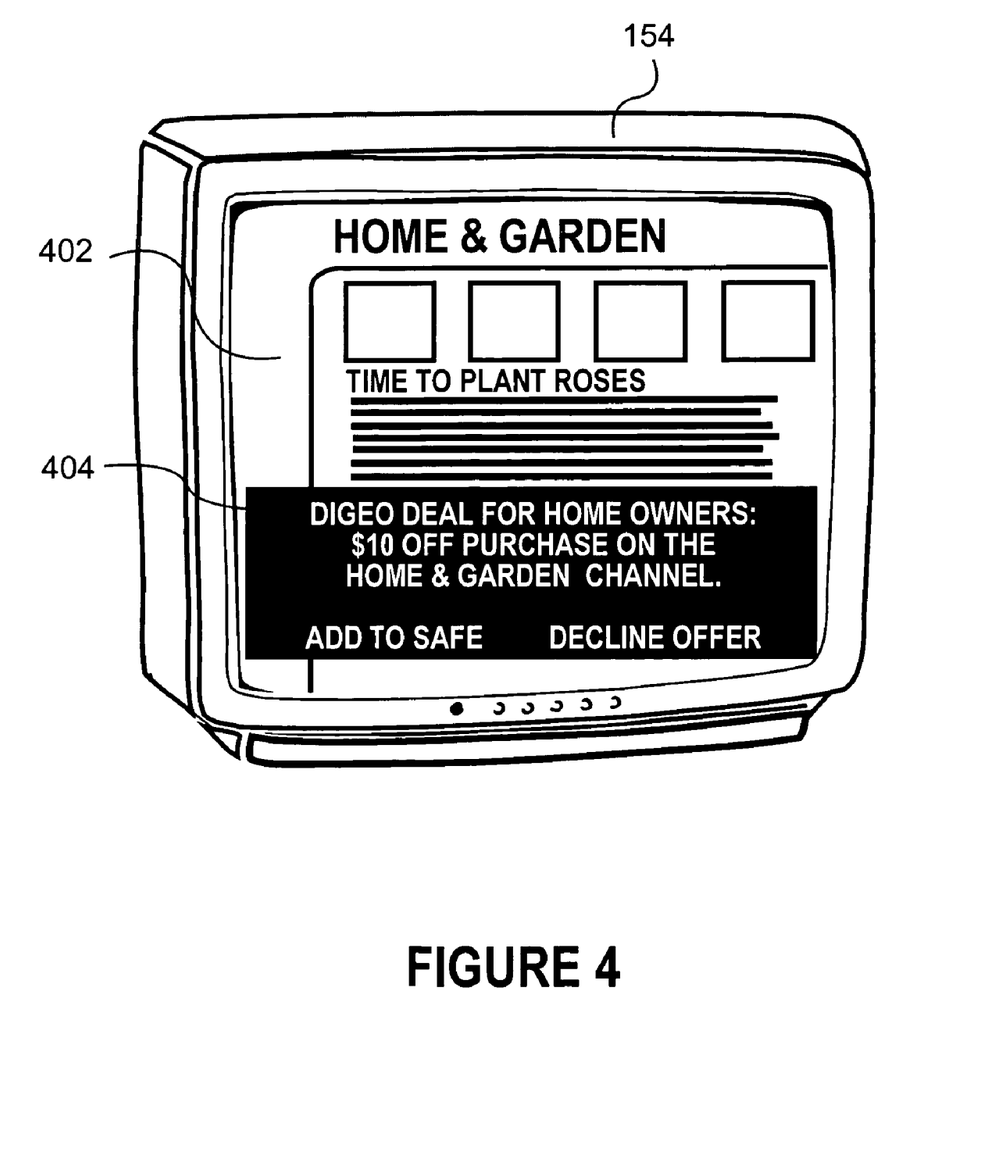
FIGS. 4-9 illustrate examples of transactions that can be conducted using the interactive video casting systems of FIGS. 1-3 according to an embodiment of the invention.

FIGS. 4-9 illustrate transactions that can be conducted using the interactive video casting systems of FIGS. 1-3 according to embodiments of the invention. In FIG. 4, a broadcast segment 402 is displayed on the television set 154 for viewing by a user. A broadcast segment can include information related to a service channel or information related to a content channel. Items/information that service channels can provide may include, but are not limited to, a user calendar, a user address book, a user recipe book, or other types of tools, interfaces, services, etc. that can be provided by the cable service provider 108, the merchant 122, or other party. Information that content channels can provide may include, but are not limited to, movies, commercials, music videos, sporting events, situation comedy shows, special interest shows, home shopping shows, or other types of programming. Service channels, content channels, or both can also display or provide access to Internet web sites, web pages, web portals, or the like. Furthermore, the terms "service channel" and "content channel" are used herein for purposes of illustration and simplicity of explanation, and it is understood that the various items available through a service channel may be made available via a content channel (and vice versa).

Also, content channels and service channels may be displayed at the concurrently on the user's interactive viewing device (e.g., on the user's television set 154). These channels may be layered on top of each other, separated into their own panels, or any combination thereof. For example, a user can layer his calendar in one corner of his display screen, on top of a broadcast of a police drama show. Once the user is finished reviewing his calendar, he may then remove the calendar from his interactive device's display.

In the example shown in FIG. 4, the broadcast segment 402 comprises a television program from a home and garden shopping channel. The home and garden shopping channel (or a topic, product, service, etc. described in the particular program) may be correlated with a user profile and product data to produce a promotion 404 for display on the television set 154. In one embodiment, the correlation may be executed by a processor located in the set top box 152, remote control unit 158, in another device coupled to the television set 154, in a head-end 306, in one or more servers in the systems shown in FIGS. 1-3, or in any suitable combination of these locations or other locations.

The user profile may include, but is not limited to, personal interests, income level, gender, age, purchase history, or previous broadcast segment viewing history of the user. Some of these user profile elements may be selected by the user when the user establishes or modifies their user profile as part of their interactive television account, according to one embodiment. For example, users may select personal interests such as golf, hiking, and computer games, as well as entering their age. Such an account may be established when subscribing to the cable service provider 108, purchasing items from the web site 124 of the merchant 122, or in other ways.

Other user profile information can be accumulated as the user participates in or uses the interactive video casting system of FIGS. 1-3. For example, if the user purchases many items related to golfing, the user profile may be updated to note the user's interest in golf items. If the user watches several golf related broadcast segments, the user profile may be updated to note the user's interest in the sport of golf. In accordance with embodiments of the invention, several techniques can be used to gather information for the user profile. For example, cookies may be used to gather user profile data, pay-per-view information or other user-viewing information can be logged that tracks the user's viewing habits, merchants 122 or other entities can exchange customer information, etc.

The product data may include, but is not limited to, broadcast segment, date, time, season, merchant product volume information, merchant catalog data, etc. For example, the product data "broadcast segment" associated with a lawn mower may be a television program on the home and garden shopping channel. The product data "date" associated with a lawn mower may be Saturday when most people think about mowing the lawn. The product data "time" associated with a lawn mower may be early morning when people who mow their lawn participate in viewing of interactive video casting. The product data "season" associated with a lawn mower may be spring when people usually need new lawn mowers. The product data "merchant product volume information" may indicate that a merchant has many lawn mowers in stock and puts a priority on selling lawn mowers over other items in stock. It is also possible to further break down these elements of product data into sub-elements, such as information related to a specific product, for a specific commercial, played at a specific time, during a specific television program. It is noted that the term "product" as used herein can refer to a merchant's products as well as services.

The product data can also include other information related to any particular merchant or merchant category, such as merchant name, geographic location, type of products/services sold, etc. In one embodiment, the user profile information, product data, information related to certain television programming or television channels, or other information or any combination of this information can include what is sometimes referred to as "metadata."

In accordance with an embodiment of the invention, a particular web site portal, the local studio 106, the cable service provider 108, or other party does not take title of goods/services offered in promotions and/or does not do cross-merchant bundling. In another embodiment, one or more of these parties can perform such activities. In an embodiment, one or more of these parties may or may not be able to exert editorial control over the presentation or copy of the products/services in the promotions. In an embodiment, promotions can be applied across any type of portal being used to convey the promotion to the user. Thus, the user can receive a particular promotion via the television set 154, PC, cellular telephone, etc. The cable service provider 108, the local studio 106, or other party can schedule and control presentation of promotions in an embodiment.

The correlation to produce or provide the promotion 404 may be performed by software or correlation algorithms, using product data, user profile information, and other data. Such correlation algorithms can be based on, in one embodiment, algorithms that are familiar to those skilled in the art or would be familiar to those skilled in the art based on the description provided herein. In an embodiment, product data can be mapped to user profiles and/or to segmentations (e.g., to geographic regions, income level, groups of users, groups of customers, etc. alternatively or in addition to individual users).

Furthermore, the broadcast segments or the interactive video casting transmission need not be live, and may be pre-recorded, played from a VCR, buffered prior to display, etc. or any suitable combination of these methods. When the broadcast segment or interactive video casting transmission is viewed by the user, promotions correlated during the original broadcast or transmission can be displayed.

Continuing with FIG. 4, the broadcast segment 402 indicates or displays the availability of the promotion 404. In an embodiment, an audio or visual indicator (or both) in the broadcast segment 402 may signal to the user that the promotion 404 is available. The user may then press the button 172 on the remote control unit 158 to result in the display of the promotion 404. The promotion may be an offer to purchase a product or may be a credit towards a future purchase. In FIG. 4, the promotion 404 is a $10 credit toward the purchase of an item on the home and garden shopping channel, for example.

This promotion 404 can be produced by correlating the user's profile of other home-product transactions with the broadcast segment of the home and garden shopping channel and the availability of product credits. For instance, if the user had previously used the interactive video casting system to obtain a mortgage for a new home, such information can be stored in the user profile. Thus, when a television program related to new homes (e.g., a commercial on the home and garden shopping channel) is broadcasted for viewing by the user, an in-context correlation can be performed to correlate the fact that the user just obtained a mortgage for a new home, that the user is watching a program on the home and garden shopping channel, and that the specific program may be applicable to new homeowners, etc. Once this correlation is made, the relevant promotion 404 can be displayed for viewing by the user.

By pressing the button 172 on the remote control unit 158, or other user input device, the user can send a command to store the promotion 404 for later use, decline the promotion 404, or apply the promotion to an immediate transaction. A storage unit for information related to the promotion 404 can be located in the set top box 152, remote control unit 158, in another device coupled to the television set 154, in a head-end 306, in one or more servers in the systems shown in FIGS. 1-3, or in any suitable combination of these locations or other locations.

Figure 5:
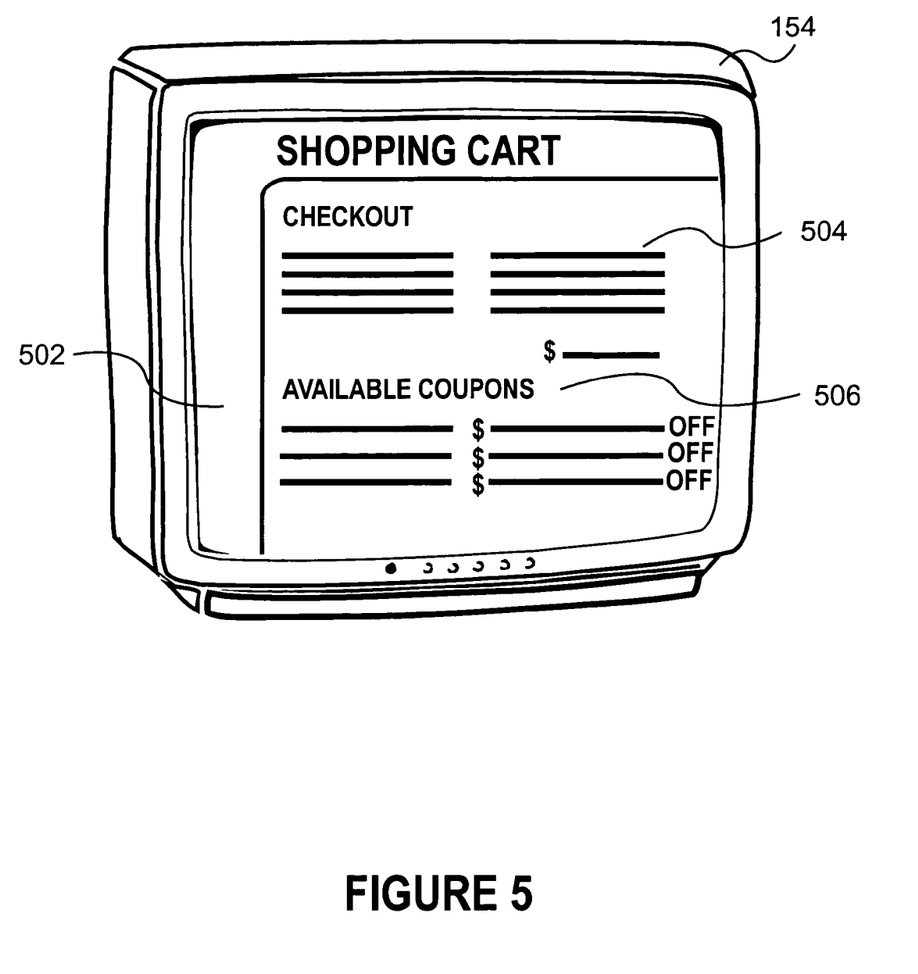

FIG. 5 illustrates a situation where the user may apply a stored promotion to a purchase. In the example in FIG. 5, the user has selected items to purchase 504 from the home and garden shopping channel broadcast segment 402 displayed on the televisions set 154. The user has completed his shopping and has accessed his shopping cart 502. As the user is completing his purchase, available promotion credits 506 that are stored for the user are displayed as part of the shopping cart 502. The user may apply any number of promotion credits 506 to the current purchase by selecting them via the remote control unit 158. Any promotion credits 506 applied by the user to the transaction are then removed from the user's storage.

Figure 6:
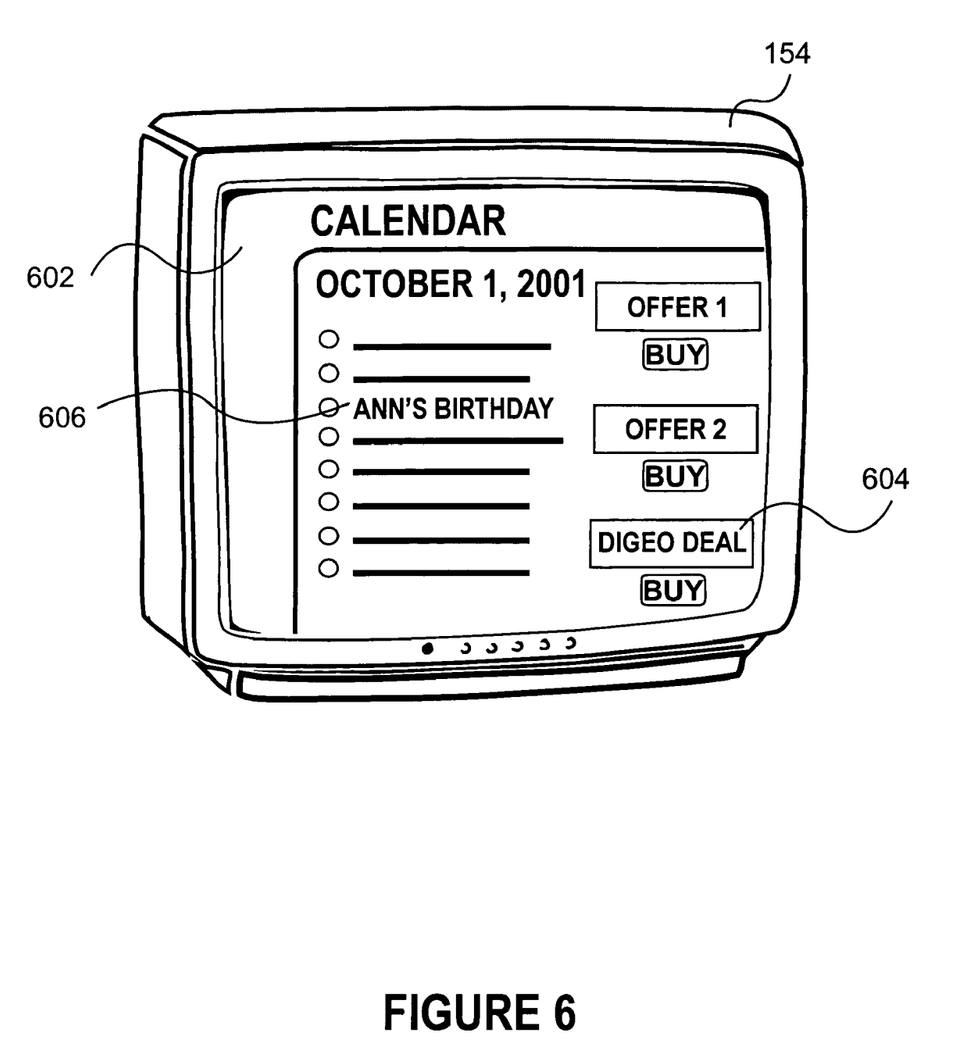

FIG. 6 illustrates a situation where a user calendar 602 displayed on the television set 154 is correlated with a promotion 604. To perform the correlation, information in the user calendar 602 can be accessible to the merchant 122, the cable service provider 108, or other party. This may be done, for instance, by linking these parties to the storage location where information for the calendar 602 is stored. In this example, the user has a calendar entry for his wife's birthday 606 in the user's calendar 602. The promotion 604 is presented as part of the user calendar 602, by overlaying the promotion 604 over the calendar for example. The user may select the promotion 604 with the remote control unit 158 to purchase a birthday gift for his wife.

Figure 7:
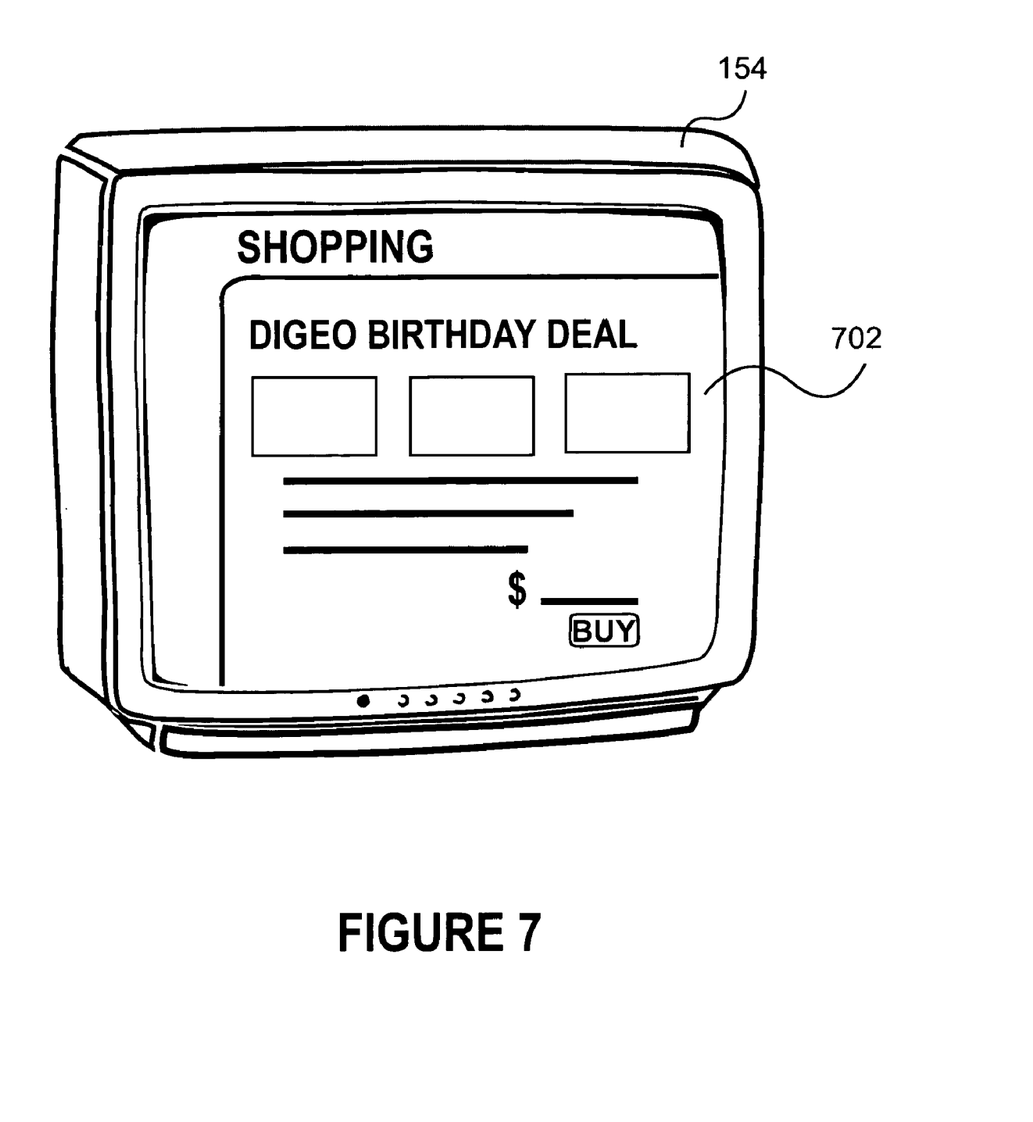

FIG. 7 illustrates a subsequent situation when the user has selected the promotion 604. The details of the promotion 604 are shown in a broadcast segment 702 displayed on the television set 154. The broadcast segment 702 may be a television commercial, a web page from the web site 124 of the merchant 122 that sells gifts, or other service that can be displayed to the user via the systems of FIGS. 1-3. After reviewing the broadcast segment 702, the user may elect to purchase the product in the broadcast segment 702 (e.g., by clicking on a BUY button or performing other activities), defer acceptance of the promotion 604, or decline the purchase through use of the remote control unit 158.

Figure 8:
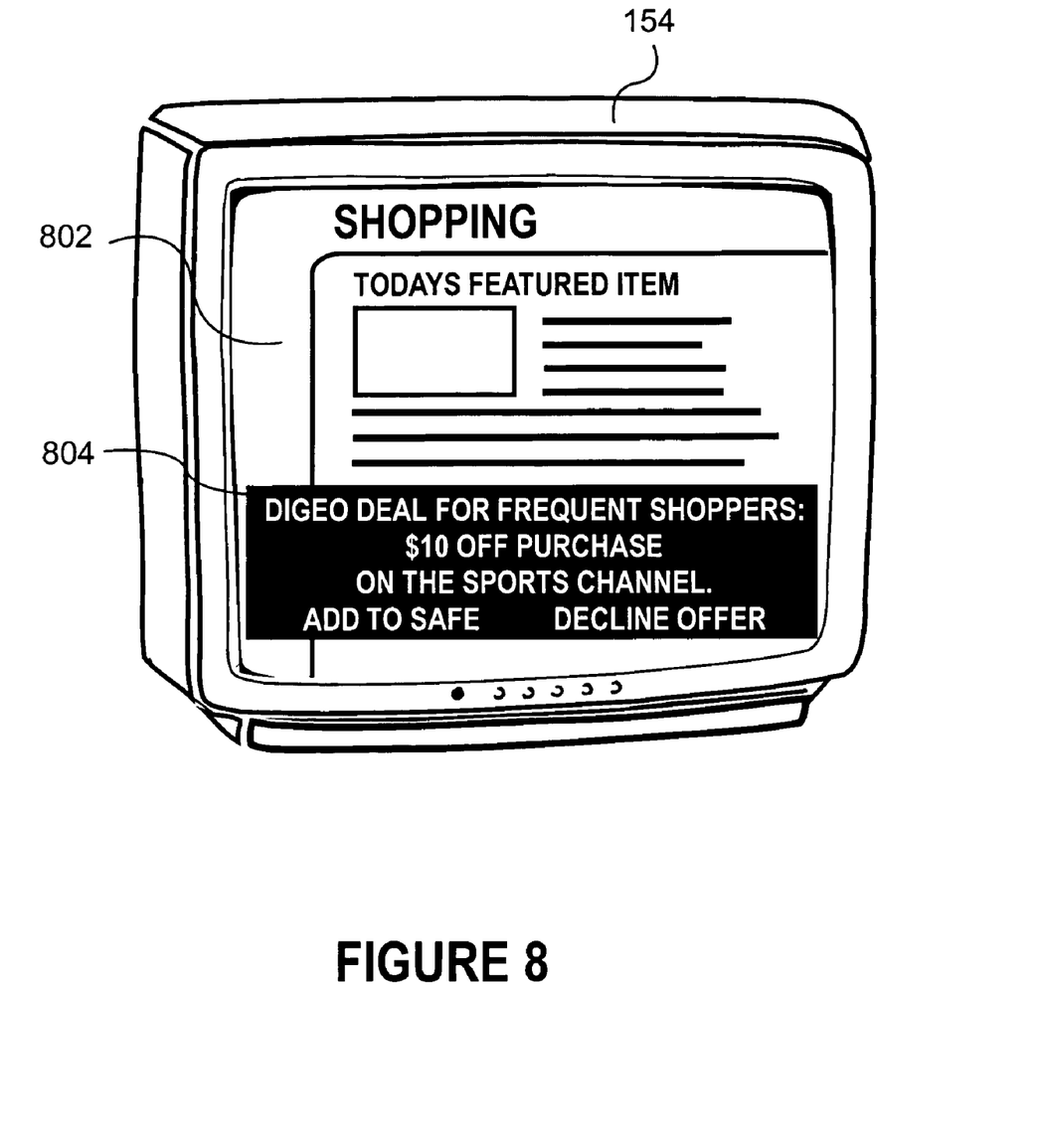

FIG. 8 illustrates a situation where the user is offered a promotion 804 because of the user's purchase history in his user profile. The user is viewing a shopping broadcast segment 802 displayed on the television set 154. The user's profile of frequent purchases and the shopping broadcast segment can be correlated with available product credits. That is, as the user becomes a frequent shopper, the promotions can reflect the user's purchase volume by targeting special frequent shopper discounts towards the user. The promotion 804 is displayed as a reward for the user's frequent purchases. Alternatively or in addition, the promotion 804 can be provided to reward the user for the user's frequent viewing of a particular channel or a particular program.

Figure 9:
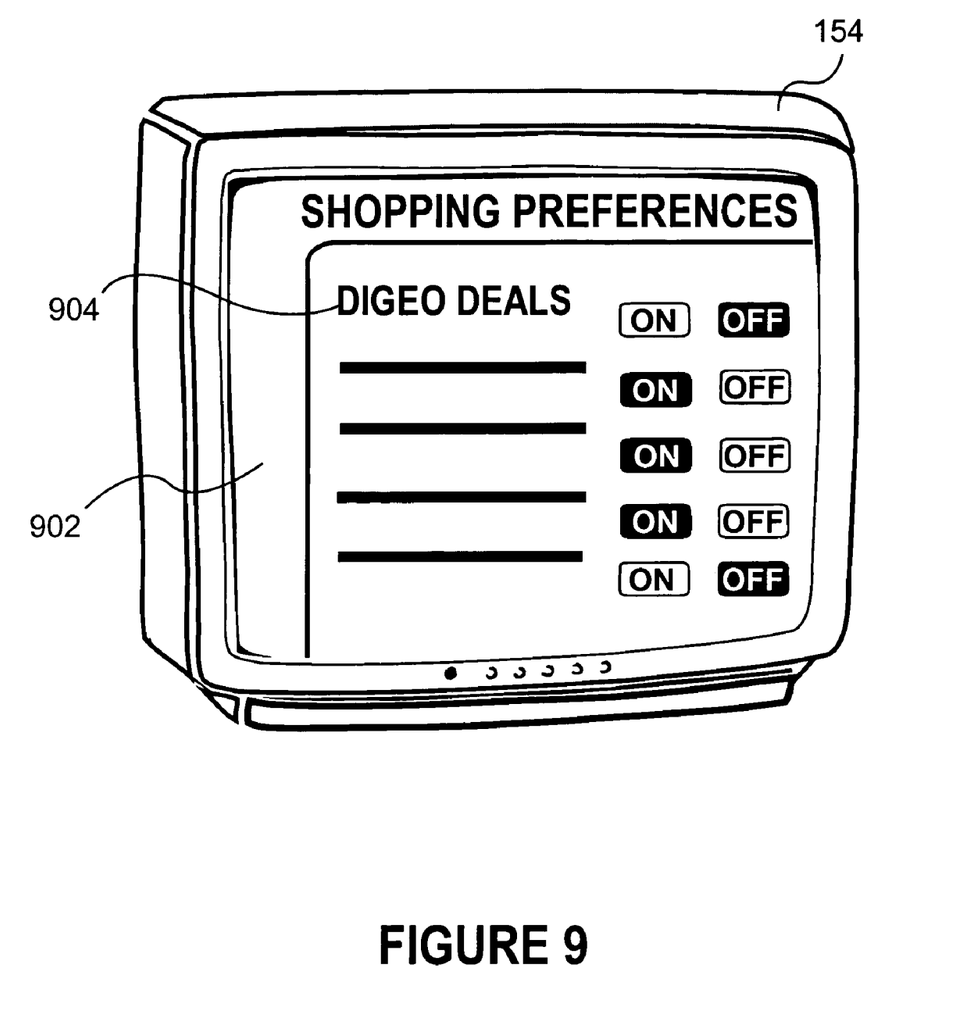

FIG. 9 illustrates a situation where the user can activate or deactivate the displaying of promotions. The user is viewing a broadcast segment 902 showing the user's shopping or viewing preferences on the television set 154. A shopping preference field 904 may by toggled on/off via the remote control unit 158. In another embodiment, the user may adjust how often promotions are displayed to the user in order to provide the most desirable viewing option to the user. Thus, the user can selectively set promotions to be displayed with regards to specific channels, programs, products/services, times of day, etc.

Figure 10:
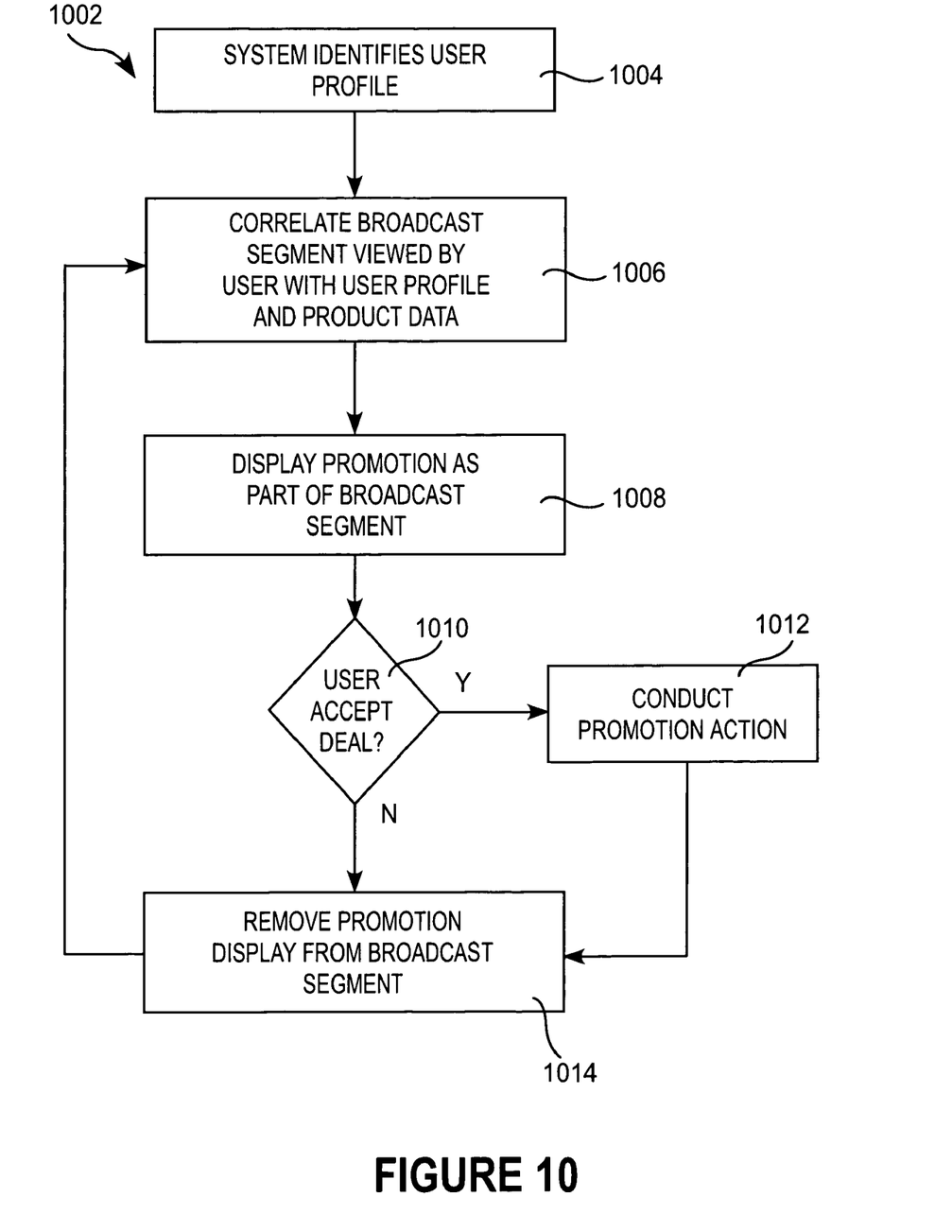
FIG. 10 is a flow diagram illustrating an example of a sequence of events during a transaction involving a promotion and conducted via the interactive video casting systems of FIGS. 1-3 according to an embodiment of the invention.

FIG. 10 is a flow diagram 1002 illustrating an example of a sequence of events to initiate and complete an action related to a promotion according to an embodiment of the invention. The elements of the flow diagram 1002 can be implemented, in whole or in part, by machine-readable instructions, software, code, etc. that is stored in one or more machine-readable storage media. The machine-readable storage media can be located in the set top box 152, remote control unit 158, in another device coupled to the television set 154, in a head-end 306, in one or more servers in the systems shown in FIGS. 1-3, or in any suitable combination of these locations or other locations.

Beginning at a block 1004, the user logs into the interactive video casting system. A system component, such as software in a server, head-end 306, set top box 152, etc. identifies the user and accesses the user's profile (or creates a user profile). The user's profile can be stored in the set top box 152, remote control unit 158, in another device coupled to the television set 154, in the head-end 306, in one or more servers in the systems shown in FIGS. 1-3, or in any suitable combination of these locations or other locations.

In one embodiment, an identifier may be located with the user's interactive device(s). For example, the identifier's form may include an identifier, code number, hardware, software, or the like, located in the set top box 152, remote control unit 158, in another device coupled to the television set 154, or in any suitable combination of these locations or other locations. By accessing the interactive video casting system, the user's identity may be determined without any input from the user. This access when the user's identity is determined may include when the user watches an interactive video casting transmission or accesses a web page via the interactive video casting system.

In another embodiment, the user can supply a username or personal identification number (PIN), made up of alphanumeric characters, to be identified by the interactive video casting system. In a household containing more than one person, a person watching interactive video casting may enter their PIN so that promotion correlation can by tailored to their interests. For example, a housewife has logged into the interactive video casting system with her unique username. Promotions have been displayed as part of broadcast segments that correlate to her user profile. Later, the housewife's son arrives home from school. As he begins to watch interactive video casting on the same portal the housewife was using, he enters his username into the interactive video casting system. This way, the interactive video casting system can display promotions correlated to his user profile.

At a block 1006, the broadcast segment viewed by the user is correlated with the user's profile and/or product data to produce a promotion. The product data may by stored in the set top box 152, remote control unit 158, in another device coupled to the television set 154, in a head-end 306, in one or more servers in the systems shown in FIGS. 1-3, or in any suitable combination of these locations or other locations. When a promotion has been produced, the promotion is displayed as part of the broadcast segment at a block 1008. The promotion may be an offer to make a purchase at that moment or may be a credit towards a future purchase.

The promotion displayed may be of a dynamic nature, of a static nature, or have elements of both natures. In one embodiment, the promotion has a dynamic nature because it is produced/generated as the user is watching a television program. The broadcast segment or television program being viewed at the moment is correlated with the user profile and product data. In another embodiment, the promotion has a static nature because it was produced prior to the user's viewing of a particular program and can be provided with less tailoring for a specific user. For example, the merchant 122 wants to offer half-price baseball caps to any user who views a baseball game for any amount of time. The merchant may not be overly concerned about the preferences or viewing habits that may be stored in a user's profile. Thus, correlation is done between the broadcast segment baseball game and the merchant's product, and the promotion may be correlated before any particular user logs on to the interactive video casting system. The promotion of half-price baseball caps can then be displayed to all baseball game viewers regardless of their user profile.

The promotion is displayed until the user decides to accept or decline the promotion, as shown at a decision block 1010. If the user elects to accept the promotion, then the appropriate action is conducted at a block 1012. The user may initiate the transaction at the decision block 1010, for example, by pressing the button 174 on the remote control unit 158, which results in the transmission of a command to the set top box 158 to communicate with the merchant 122 or other party to conduct the transaction. If the promotion is for a purchase, then the user may complete the purchase. If the promotion is for a credit toward a future purchase, then the promotion is stored in the user's storage. The promotion may also be stored for future viewing without necessarily applying it as a credit. After the user has conducted the promotion action or has elected to decline the promotion, the promotion display is removed from the broadcast segment at a block 1014. At this point, the process starts again at the block 1006 correlating more promotions.

Figure 11:
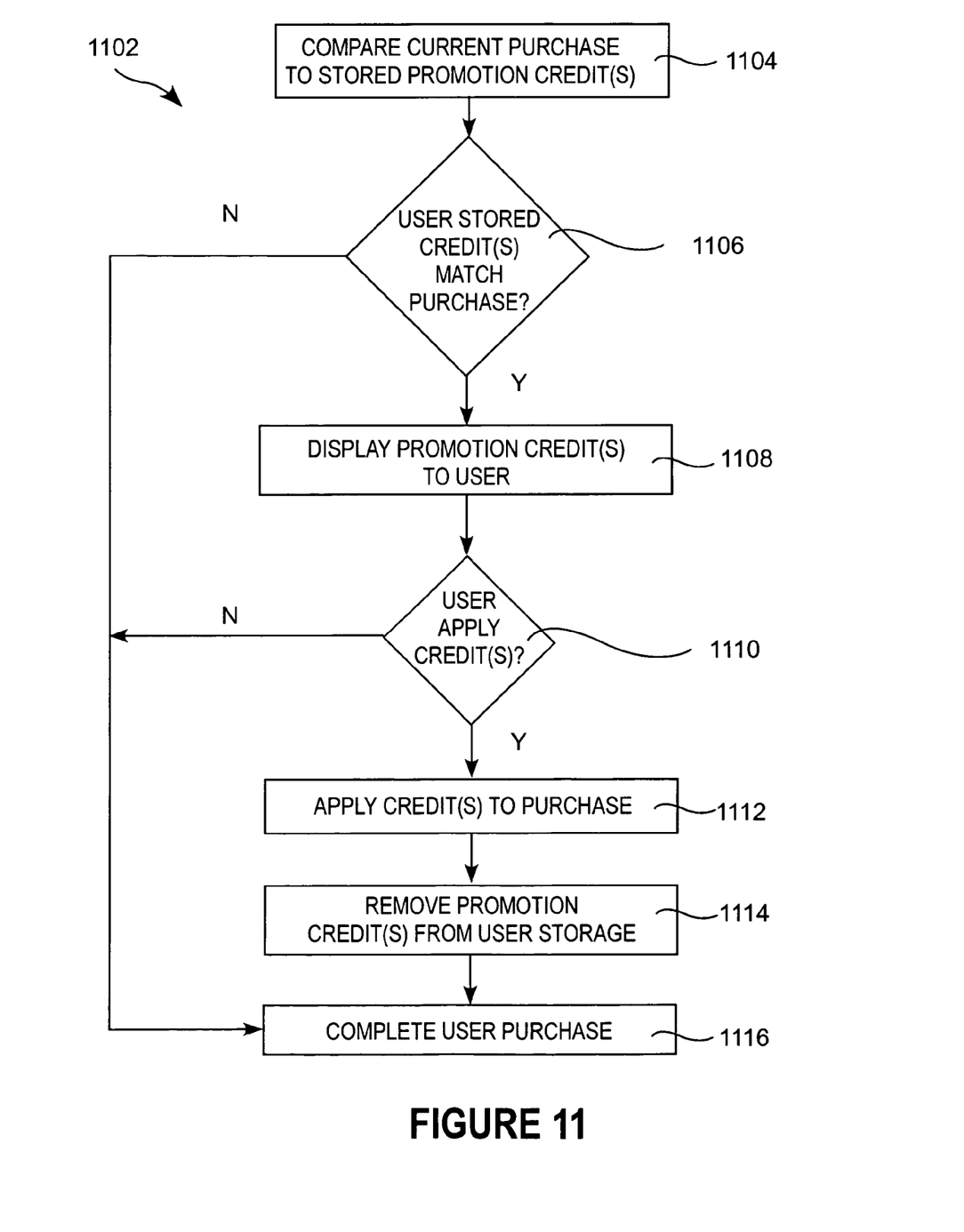
FIG. 11 is a flow diagram illustrating an example of a sequence of events during a transaction conducted via the interactive video casting systems of FIGS. 1-3 according to an embodiment of the invention.

FIG. 11 is a flow diagram 1102 illustrating an example of a sequence of events to initiate and complete transaction according to an embodiment of the invention, where the user is applying a promotion as a credit. The elements of the flow diagram 1102 can be implemented, in whole or in part, by machine-readable instructions, software, code, etc. that is stored in one or more machine-readable storage media. The machine-readable storage media can be located in the set top box 152, remote control unit 158, in another device coupled to the television set 154, in head-end 306, in one or more servers in the systems shown in FIGS. 1-3, or in any suitable combination of these locations or other locations.

Initially, the user has identified at least one item he wishes to purchase through the interactive video casting system. Before completing the purchase transaction at a block 1104, each purchase is compared to the promotion credits (if any) stored in the user's storage. At a decision block 1106, if any of the stored promotions may be applied to any items being purchased, these applicable promotion credits are displayed in the broadcast segment to the user at a block 1108. If none of the stored promotion credits may be applied or the user does not have any stored promotion credits, then the purchase is completed at a block 1116.

At a decision block 1110, the user may decide which promotion credits he wants applied to his purchase. If the user does not want to apply any of his promotion credits, then the purchase is completed at the block 1116. If the user elects to apply at least one of his stored promotion credits, then the credit(s) are applied to the purchase at a block 1112, and the applied promotion credit(s) are removed from the user's storage at a block 1114. The purchase is then completed at the block 1116.

In conclusion, a user may be presented with promotions on products and services via interactive video casting systems shown in FIGS. 1-3. These promotions may be produced by correlating the interactive video casting broadcast segment with the user's profile and/or product data. As an example, while the viewer is watching a program on the home and garden channel 402, the viewer is presented with the promotion 404 that is a credit toward a future purchase. The viewer may accept the offer, elect to store the promotion for later use, or may elect to decline the promotion altogether. In another embodiment, the promotion may be an offer to purchase a product or service at that moment.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

In accordance with an additional embodiment of the present invention, the method and system to provide deals and promotions are integrated by software across multiple portals of the interactive video casting system. The multiple portals may include, for example, all or some of the following: an interactive television portal; a computer portal; a personal digital assistant portal; and a cellular phone portal. Such integration across multiple portals increases and magnifies the power of the deals and promotions to encourage more frequent transactions.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An article of manufacture, comprising:
a computer-readable storage medium having stored thereon instructions for causing a computer to:
correlate different sets of information to determine whether to provide a promotion;
if the promotion is to be provided, combine the promotion with a broadcast segment provided via an interactive video casting system; and
process a command sent from a user input device to apply an element of the promotion to a transaction conductable via the interactive video casting system; wherein the different sets of information include a first set of product data and a second set of broadcast segment data;
wherein the command comprises a first command, the machine-readable medium further including instructions stored thereon to:
compare a user's current transaction conducted via the broadcast segment to promotion information stored in a storage unit associated with the user, the promotion information corresponding to at least one promotion previously provided to the user;
if the at least one promotion corresponding to promotion information stored in the user's storage unit is applicable to the user's current transaction, provide all applicable promotions to the user;
process a second command sent from the user input device to apply at least one of the provided promotions to the user's current transaction; and
remove information related to the applied at least one promotion from the storage unit.

2. The article of manufacture of claim 1 wherein the element of the promotion comprises a credit, the computer-readable medium further having instructions stored thereon to, in response to receiving the command from the user input device, store the credit in a storage unit for application towards a future transaction conduct able via the interactive video casting system.

3. The article of manufacture of claim 1 wherein the product data comprises data indicative of at least one of date, time, season, or merchant product volume information.

4. The article of manufacture of claim 1, wherein the machine computer-readable medium comprises instructions to correlate the promotion with a calendar entry in a calendar of a user, and display the promotion together with the calendar entry.

5. A system, comprising:
an interactive video casting network coupleable to a communication network to provide a broadcast segment, having a promotion, as part of an interactive video display transmission; and
a server coupleable to the interactive video casting network, the server including:
a storage unit having different sets of information stored therein capable of being correlated to determine whether to provide the promotion;
a processor communicatively coupled to the storage unit, the processor capable to trigger correlation of the different sets of information stored in the storage unit to determine whether to provide the promotion and, if the promotion is to be provided, then to control insertion of the promotion into the broadcast segment; and
a communication interface communicatively coupled to the processor to provide the broadcast segment having the promotion to a client terminal;
wherein the different sets comprise a first set of product data and a second set of broadcast segment data and a calendar of the user and the promotion, and the processor is capable to determine whether to provide the promotion based on correlation of the first and second sets and based on correlation of the promotion with a calendar entry in the user's calendar, and the processor is capable to display the promotion together with the calendar entry to the user.

6. The system of claim 5 wherein the interactive video casting network comprises an interactive television network;
the server further comprises another storage unit capable to store promotion data in response to a command received from the client terminal via the communication interface to defer application of the promotion;
the server is coupled to store data related to the promotion in a first storage location coupled to the client terminal or in a second storage location at a head-end of the interactive video casting network; and
the processor is further capable to apply the promotion to a transaction in response to a command received from the client terminal via the communication interface to initiate the transaction.

7. The system of claim 5, wherein the product data comprises data indicative of at least one of date, time, season, or merchant product volume information.

8. The system of claim 5, wherein the processor is capable to:
compare a user's current transaction to promotion information stored in the storage unit, the promotion information corresponding to at least one promotion previously provided to the user;
if the at least one promotion corresponding to promotion information stored in the storage unit is applicable to the user's current transaction, provide all applicable promotions to the user via the client terminal;
receive a command to apply at least one of the provided pro motions to the user's current transaction; and
remove information related to the applied at least one promotion from the storage unit.

9. A method for providing targeted promotions via an interactive video casting system, the method comprising:
correlating information from a plurality of merchants with data on usage of the interactive video casting system by a viewer and with a calendar of the user to determine a promotion to provide to the viewer with a matching entry from the user's calendar;

providing information related to the promotion to the viewer together with the matching entry from the user's calendar by way of at least one portal of the interactive video casting system; and processing a command sent from a viewer input device in response to the information to initiate a transaction related to the promotion;

wherein the product data comprises data indicative of at least one of, date, time, season, or merchant product volume information.

10. The method of claim 9 wherein the at least one portal comprises at least one of an interactive television portal, a computer portal, or a mobile device portal.

11. The method of claim 9, comprising:

comparing the transaction to promotion information corresponding to at least one promotion previously provided to the viewer;

if the at least one promotion previously provided to the user is applicable to the transaction, providing all applicable promotions to the viewer; and receiving a command sent from the viewer input device to apply at least one of the provided promotions to the transaction.

* * * * *